(12) United States Patent
Ali et al.

(10) Patent No.: US 6,868,271 B2
(45) Date of Patent: Mar. 15, 2005

(54) ADAPTIVE FAST CELL SWITCHING IN CELLULAR COMMUNICATIONS SYSTEMS

(75) Inventors: Ahmed H. Ali, Ottawa (CA); Ali Iraqi, Ottawa (CA); Sophie Vrzic, Nepean (CA)

(73) Assignee: Nortel Networks Limited, St. Laurent (CA)

(*) Notice: Subject to any disclaimer, the term of this patent is extended or adjusted under 35 U.S.C. 154(b) by 525 days.

(21) Appl. No.: 10/107,070

(22) Filed: Mar. 28, 2002

(65) Prior Publication Data

US 2004/0203790 A1 Oct. 14, 2004

(51) Int. Cl.$^7$ ................................. H04Q 7/20
(52) U.S. Cl. .................... 455/442; 455/453; 455/452.1; 455/441
(58) Field of Search .............................. 455/452.1, 453, 455/436, 441, 442, 444

(56) References Cited

U.S. PATENT DOCUMENTS

| | | | | |
|---|---|---|---|---|
| 5,913,168 A | * | 6/1999 | Moreau et al. ............... | 455/441 |
| 6,208,863 B1 | * | 3/2001 | Salonaho ...................... | 455/444 |
| 6,370,357 B1 | * | 4/2002 | Xiao et al. ................. | 455/67.11 |
| 6,490,442 B1 | * | 12/2002 | Billon ....................... | 455/226.1 |
| 6,611,688 B1 | * | 8/2003 | Raith ......................... | 340/992 |
| 6,748,222 B1 | * | 6/2004 | Hashem et al. .............. | 455/453 |
| 6,801,511 B2 | * | 10/2004 | Park ........................... | 370/331 |
| 2002/0034946 A1 | * | 3/2002 | Davies et al. ............... | 455/436 |
| 2002/0102976 A1 | * | 8/2002 | Newbury et al. ............ | 455/436 |
| 2002/0137515 A1 | * | 9/2002 | Igarashi et al. ............. | 455/436 |
| 2002/0168991 A1 | * | 11/2002 | Kochanski et al. .......... | 455/505 |

* cited by examiner

*Primary Examiner*—W. R. Young
*Assistant Examiner*—Dai A Phuong

(57) ABSTRACT

A cellular communications system uses FCS (fast cell switching) for forward communications links, for communicating data from respective cells or sectors to a mobile terminal, in response to FCS requests by the terminal on a reverse communications link. An FCS rate, or rate of said requests, is varied in dependence upon a C/I reliability criterion, which represents a reliability with which C/I is determined and predicted by the mobile terminal, for example being either of two selected rates depending upon a comparison of the criterion with a threshold. The criterion can be, for example, a determined speed of the mobile terminal, or an averaged probability that a C/I prediction error is less than a predetermined amount.

19 Claims, 2 Drawing Sheets

ADAPTIVE FAST CELL SWITCHING IN CELLULAR COMMUNICATIONS SYSTEMS

This invention relates to cellular communications systems, and is particularly concerned with so-called fast cell switching in such systems, for example wireless cellular communications systems which can communicate packet data (and optionally other) traffic with mobile terminals.

BACKGROUND

In a wireless cellular communications system which uses forward link (from a base station to a remote, e.g. mobile terminal) rate adaptation and fast scheduling for packet data services for which the packet data traffic is relatively insensitive to delay, it has been proposed to use fast cell/sector switching to replace or supplement soft handoff. For simplicity, the term fast cell switching and its abbreviation FCS are used herein to embrace fast cell or sector switching.

An advantage of FCS is that transmission takes place to each mobile terminal from only one cell (or sector) at any particular instant or time slot. This eliminates a need for scheduling coordination among multiple cells in dynamic packet data environments, and reduces both forward link power and inter-cell interference, thereby facilitating an increase in system capacity.

In FCS, a mobile terminal determines an optimum cell (or sector) within an active set via which it wishes to receive communications on the forward link (or downlink), and communicates this to the base station (BTS) through reverse link (or uplink) signalling. In order to determine an optimum cell or sector, the mobile terminal can average over several time slots the C/I (carrier-to-interference ratio) for each cell or sector, and can select the cell or sector having the best average C/I. The term C/I is used herein to embrace any channel quality estimate or indicator.

A disadvantage of this is that there is a delay between the selection of the optimum cell or sector and the actual switching to this cell or sector, this delay (referred to herein as an FCS delay) including a reverse link signalling delay for the FCS request from the mobile terminal, and a switching delay at the base stations. While prediction can be used to estimate the C/I to allow for the FCS delay, such prediction is unreliable in the event that the C/I varies rapidly, as is typically the case for a mobile terminal moving faster than a relatively low speed. Accordingly, in such cases FCS may provide an overall significant degradation of performance, rather than an improvement as is desired.

Accordingly, there is a need to facilitate implementing FCS in an effective manner which can avoid or substantially reduce this disadvantage.

SUMMARY OF THE INVENTION

According to one aspect of this invention there is provided, in a terminal of a cellular communications system in which fast cell switching (FCS) is provided for selecting forward communications links, for communicating data from respective cells or sectors to the terminal, in response to FCS requests by the terminal on a reverse communications link, a method of determining a rate for FCS requests by the terminal comprising the steps of: monitoring C/I (carrier-to-interference ratio) for a plurality of forward communications links to determine preferred forward communications links; determining a C/I reliability criterion; and making FCS requests each for a preferred forward communications link at a rate dependent on the C/I reliability criterion, said rate being relatively higher for relatively greater C/I reliability.

Where the terminal is a mobile terminal, it is possible for the C/I reliability criterion to comprise a determined speed of the mobile terminal.

Preferably, however, the C/I reliability criterion comprises a probability that a difference between two C/I values, separated by a predetermined delay, for a forward communications link is less than a predetermined amount. Preferably the probability is averaged over a plurality of time slots of the system, and the predetermined delay preferably corresponds to a fast cell switching delay.

Conveniently the FCS requests are made by the terminal at a selected one of two rates, comprising a relatively high rate for relatively greater C/I reliability and a relatively low rate for relatively lesser C/I reliability. For example, the relatively high rate can be of the order of about 100 Hz and the relatively low rate can be of the order of about 10 Hz.

Another aspect of the invention provides a method of communicating requests from a terminal for communication of data to the terminal using preferred communications links associated with respective cells or sectors of a cellular communications system, comprising the steps of, at the terminal: monitoring C/I (carrier-to-interference ratio) for a plurality of communications links to determine the preferred communications links; and making said requests at a relatively high rate in response to relatively slow variation of C/I and at a relatively low rate in response to relatively fast variation of C/I.

This method preferably includes the step of averaging a C/I prediction error for a delay corresponding to a delay for requesting and making a switch to a preferred communications link, and selecting one of a plurality of rates for making said requests in dependence upon the averaged C/I prediction error.

According to another aspect, this invention provides a cellular communications system comprising base stations for communicating signals on forward communications links for respective cells or sectors to mobile terminals and for receiving signals from mobile terminals on reverse communications links, said signals on the reverse communications links including requests from a mobile terminal for switching of communications from a current forward communications link to another forward communications link having a better C/I (carrier-to-interference ratio) as determined by the mobile terminal, the base stations being responsive to such requests for switching said communications, wherein at least one mobile terminal is arranged for changing a rate at which it makes said requests in dependence upon a criterion having a substantial correlation to a reliability with which C/I is determined by the mobile terminal, the mobile terminal changing said rate at least between a relatively high rate for a relatively high reliability and a relatively low rate for a relatively low reliability of the C/I determination.

For example, said criterion can comprise a speed of the mobile terminal determined by the mobile terminal, a prediction error of C/I monitored by the mobile terminal, or an averaged probability that a prediction error of C/I monitored by the mobile terminal is less than a predetermined amount.

Conveniently the mobile terminal is arranged to make said requests at a selected one of two rates, for example of the order of about 100 Hz for relatively greater reliability and for example of the order of about 10 Hz for relatively lesser reliability of C/I determination.

BRIEF DESCRIPTION OF THE DRAWINGS

The invention will be further understood from the following description by way of example with reference to the accompanying drawings, in which.

DETAILED DESCRIPTION

Figure 1:
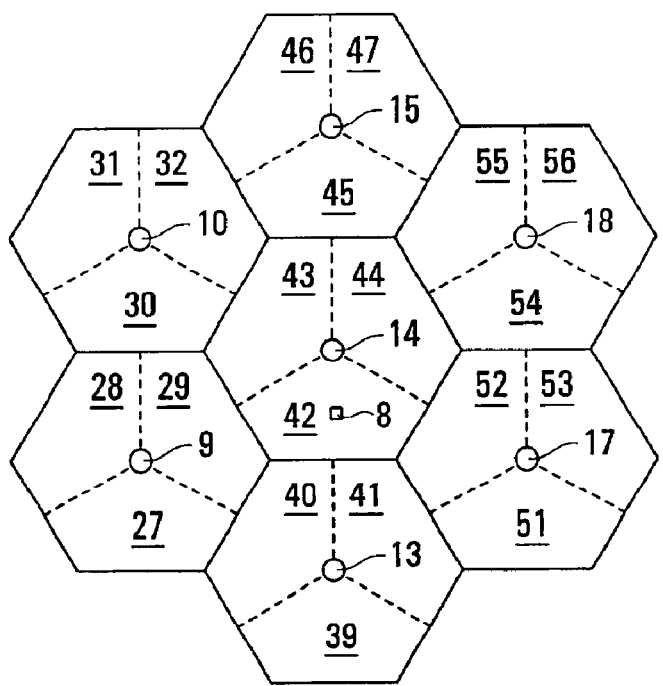
FIG. 1 illustrates a hexagonal cell layout representing part of a wireless cellular communications system.

Referring to the drawings, FIG. 1 illustrates a hexagonal cell layout representing part of a wireless cellular communications system, which comprises base stations 9, 10, 13, 14, 15, 17, and 18 each represented by a circle within a respective hexagonal cell comprising three sectors, the sectors being referenced 27 to 32, 39 to 47, and 51 to 56. The reference numbers of the base stations and sectors are selected so that for a base station numbered m, the three sectors of the cell associated with that base station are numbered 3m, 3m+1, and 3m+2. FIG. 1 also illustrates by a square referenced 8 a mobile terminal of the system, which is typically one of a large number of remote terminals operating in the system and communicating with the base stations. The description below refers only to the mobile terminal 8, but the same can apply to each remote terminal in the system.

In the system represented in FIG. 1, forward link (from a base station to a mobile terminal) rate adaptation and fast scheduling can be used for communicating packet data traffic which is relatively insensitive to delay. With fast cell switching (FCS) in such a system, the mobile terminal 8 averages C/I for signals transmitted by the base stations in their respective cells and sectors, and determines from these an optimum cell (or sector) via which it wishes to receive communications. In order to request a change from the forward link which is currently in use, the mobile terminal 8 uses reverse link signalling. The change takes place after an FCS delay which, including the time required for the reverse link signalling, may for example be of the order of 3 time slots in a system with a time slot duration of 1.25 ms.

For example, with the mobile terminal 8 in the sector 42 as illustrated in FIG. 1, the mobile terminal may typically be communicating with the base station 14. However, the position and movement of the mobile terminal 8, signal propagation conditions, and other parameters such as signal power and code space for the forward links may be such that the mobile terminal 8 determines, possibly using prediction to allow for the FCS delay, that an optimum forward link is that of a different base station and/or sector, for example one of the adjacent sectors 43 and 44 associated with the same base station 14, or one of the adjacent sectors 29, 40, 41, and 52 associated with the base stations 9, 13, and 17.

However, although it has been recognized that FCS can enable a mobile terminal to choose the supposedly best forward link, typically in terms of C/I (carrier-to-interference ratio), with frequent switching to the best determined cell or sector, it has not been determined how to do this in an optimum manner. In particular, it has not hitherto been determined how the mobile terminal should best determine an optimum forward link for FCS, taking into account parameters such as the FCS frequency or rate, position of the mobile terminal within a cell or sector, and speed of movement of the mobile terminal.

The present inventors have determined that relatively high FCS frequencies or rates provide a throughput gain for data packets, due to improved tracking of channel conditions and hence C/I, up to certain speeds of the mobile terminal, but introduce a significant throughput loss for higher mobile terminal speeds. The throughput loss due to FCS at higher mobile terminal speeds is understood to be due to more rapid changes in the communications channel at such higher speeds, resulting in reduced accuracy in estimating C/I. Contrary to what might be expected, increasing the FCS rate for higher mobile terminal speeds does not generally produce a gain in throughput. It can be appreciated that the term "FCS rate" as used herein means both the rate at which fast cell switching takes place and, equivalently, the rate at which FCS requests are made by the mobile terminal.

Figure 2:
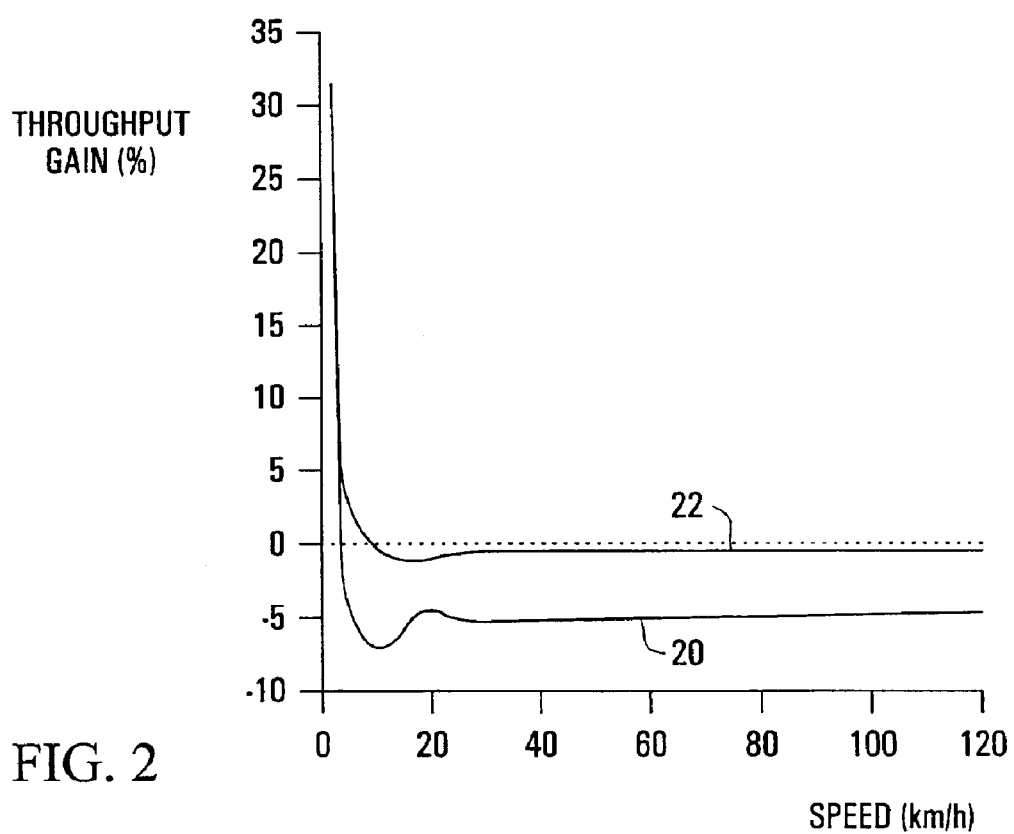
FIG. 2 is a graph illustrating variation of throughput gain with speed of a mobile terminal, using FCS in known manner and in accordance with an embodiment of this invention.

More particularly, a curve 20 in FIG. 2 illustrates dependence of throughput gain for a mobile terminal, as a percentage (which is negative for a throughput loss), with speed of the mobile terminal, in a system with an FCS rate of 100 Hz. It can be seen from this that for a mobile terminal speed below about 5 km/h there can be a substantial throughput gain, up to about 30%, as a result of the FCS, but for mobile terminal speeds above 5 km/h there is a significant throughput loss, typically of the order of 5% (i.e. −5% in the graph of FIG. 2).

In contrast, the present inventors have determined that with a slower FCS rate, for example with a cell or sector switching rate of 10 Hz, there is a much smaller throughput gain due to the FCS for a mobile terminal speed less than about 5 km/h. In this case the throughput loss due to FCS when the mobile terminal speed is greater than about 5 km/h is greatly reduced to a small value.

The particular throughput gains and losses for different FCS rates are dependent upon other parameters such as, for example, the position of the mobile terminal in a sector, and characteristics of the system including different FCS delays; they can be determined for example by measurement or simulation in any particular case.

In one example, assuming an FCS delay of 3 time slots with a time slot duration of 1.25 ms, it has been determined that with an FCS rate of less than about 20 Hz the throughput gain or loss at all mobile terminal speeds and positions is less than about 2%. For an FCS rate of 20 Hz or more, the throughput gain is positive for low speeds of the mobile terminal, and decreases and becomes negative (throughput loss) as the mobile terminal speed increases, with a transition from throughput gain to throughput loss for a mobile terminal speed of about 5 km/h.

Below this transition speed, generally a higher FCS rate produces a higher throughput gain; however, the FCS rate can not be more than the inverse of the time slot duration, and high FCS rates result in greater overhead for example for reverse link signalling and cell or sector switching. In addition, the throughput gain does not increase linearly with increasing FCS rate; for example for a mobile terminal speed of 1 km/h the gain starts to level off at an FCS rate of about 40 Hz. The throughput gain due to FCS is also dependent upon the position of the mobile terminal in the sector, typically being greater for positions increasingly distant from the base station (an outer sector region) for which the throughput gain may be of the order of 30% for an FCS rate of 100 Hz and a mobile terminal speed of 1 km/h. In contrast, with an FCS rate of 100 Hz and a mobile terminal speed of 120 km/h there is in this example a throughput loss of about 7.5% for all positions within the sector.

These results are understood as follows. For mobile terminal speeds below about 5 km/h there is a slow variation in communications channel conditions, which allows the mobile terminal to track channel fading conditions and to switch accordingly to the best forward channel using the FCS process. Thus the higher the FCS rate for low mobile terminal speeds, the better is the tracking of channel variation. For higher mobile terminal speeds, the mobile terminal can not reliably track the faster channel variations, so that frequent switching in the FCS process has two adverse effects. Firstly, the forward link selected as best is subject to rapid change and may not remain the best after the FCS delay, resulting in performance degradation and significant signalling overhead. Secondly, fast switching or hopping among different sectors or forward links reduces the benefits of averaging the effects of fast fading to obtain a reliable C/I determination based on the position of the mobile terminal. Consequently, at higher mobile terminal speeds, FCS tends to produce a performance (throughput) loss which increases with increasing FCS rate.

With this understanding, the present invention provides an adaptive FCS process in which the FCS rate is changed in dependence upon a C/I reliability criterion. The C/I reliability criterion can be, and preferably is, a C/I prediction error for example as described in detail below, or it can be any other parameter which has a correlation with reliability with which a mobile terminal can determine C/I of a communications channel. For example, such other parameter can comprise a speed of movement of the mobile terminal, determined by the mobile terminal. The term C/I is used here and throughout this specification to include other and related signal to noise and interference characteristics of a communicated signal, such as signal-to-noise ratio (SNR).

In an embodiment of the invention described below, the FCS rate is selected to be one of two possible rates, specifically a relatively high FCS rate, for example 100 Hz, when it is determined from the C/I reliability criterion that channel variation is reliably tracked (generally corresponding to low speeds of the mobile terminal), and a relatively low FCS rate, for example 10 Hz, when it is determined from the C/I reliability criterion that tracking of channel variation is less reliable (generally corresponding to higher speeds of the mobile terminal). However, it can be appreciated that the invention is not limited in this respect, and that in other embodiments of the invention the FCS rate can be selected from more than two possible rates, or can be adaptively changed in any other desired manner.

Figure 3:
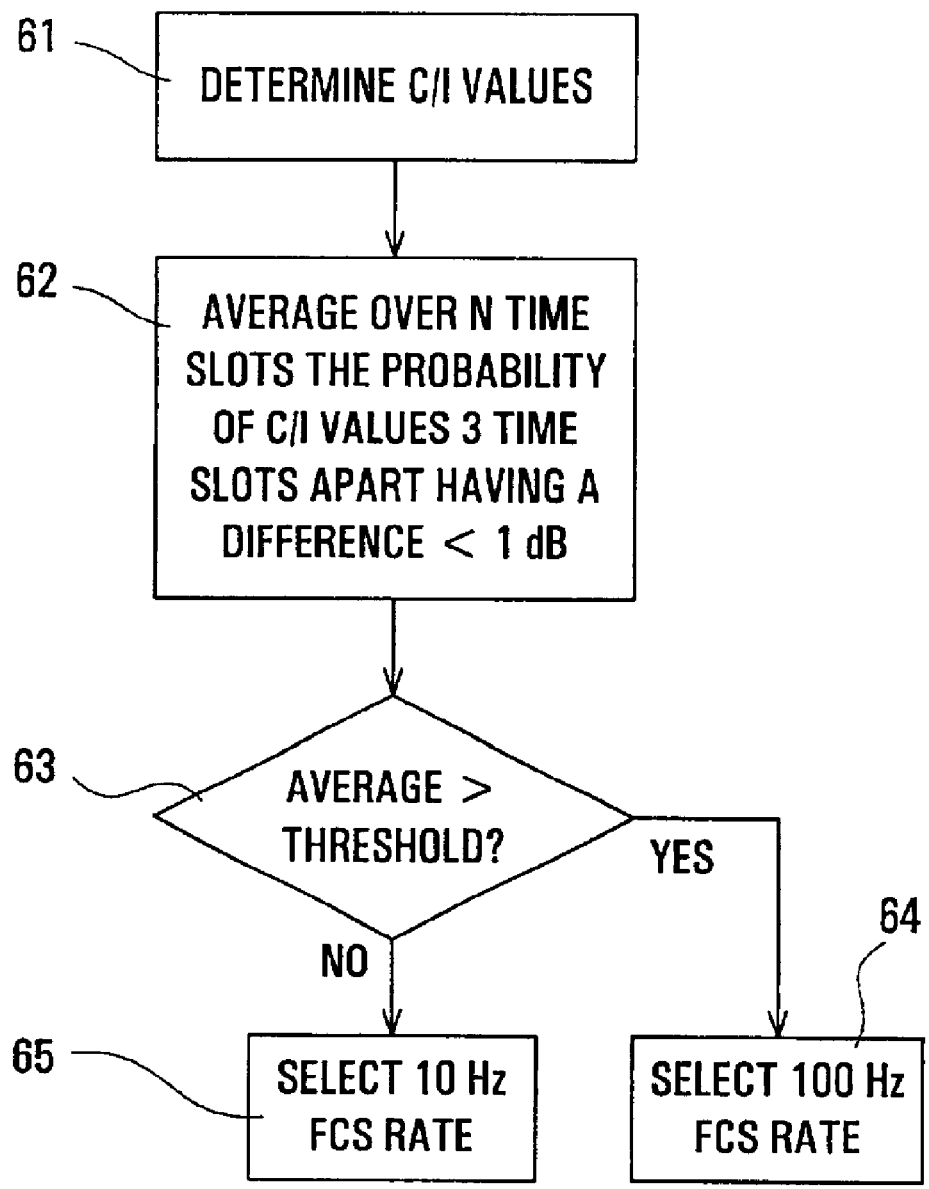
FIG. 3 is a flow chart of steps carried out in accordance with an embodiment of this invention.

FIG. 3 is a flow chart of steps carried out, in accordance with an embodiment of this invention, by a mobile terminal in a wireless cellular communications system which makes use of FCS. These steps are represented by respective blocks 61 to 65 in FIG. 3. For this embodiment of the invention, it is assumed that the time slot duration is 1.25 ms, that the FCS delay is 3 time slots, that a selection is made of either of two FCS rates which are 10 Hz and 100 Hz, and that an error of 1 dB is used as a threshold criterion for the step 61 as described below. It can be appreciated that each of these figures is given by way of example and may be changed as may be desired.

In the step 61, the mobile terminal determines C/I values; this is a part of the normal operation of the mobile terminal and can be carried out in any desired manner. It can be appreciated that this determination of C/I values is carried out for not only the forward link via which the mobile terminal is currently receiving information, but also for each other forward link to which a fast cell switch may potentially be made, so that averages of the C/I values can be compared to determine an optimum forward link to which a fast cell switch may be requested. However, for use in determining a selection between the two FCS rates in this embodiment of the invention, conveniently the mobile terminal makes use of only the C/I values determined for the forward link currently in use; in other embodiments of the invention the C/I values of one or more other forward links could be used instead or as well.

Designating a determined C/I value for a time slot n as $(C/I)_n$, a probability p that the magnitude of any difference between two C/I values spaced by the FCS delay, i.e. 3 time slots apart, is less than a threshold of in this case 1 dB can be expressed by the equation:

$$p = Pr[|(C/I)_n - (C/I)_{n-3}| < 1]$$

where Pr[ ] denotes a probability function and the C/I values are in dB. As can be appreciated, this probability p will be high (close to 1) when there is a small difference between the C/I values, and hence when the channel variation is relatively slow as is typically the case at slow speeds of the mobile terminal, and will typically be relatively low (closer to 0) when the channel variation is relatively rapid as is typically the case at higher speeds of the mobile terminal.

Thus such a probability p is a C/I reliability criterion, which represents a degree to which the current determined C/I values can be relied upon as determinations of the actual C/I values which may prevail for each forward link after the FCS delay. However, as this probability may vary considerably from one time slot to the next, it is averaged over a plurality of N time slots, and the averaged probability is used as the C/I reliability criterion. N is an integer greater than one, and is preferably large to enhance the probability determination. As one example, N may be 1000.

Thus in the step 62 the mobile terminal averages over N time slots the probability that C/I values which are 3 time slots apart have a difference less than 1 dB. The averaging can be carried out in any desired manner, but for example can be a moving average represented by the equation:

$$p(t_{n+1}) = \begin{cases} p(t_n)\frac{N-1}{N} + \frac{1}{N} & \text{if } |(C/I)_n - (C/I)_{n-3}| < 1 \text{ dB} \\ p(t_n)\frac{N-1}{N} & \text{otherwise} \end{cases}$$

where $p(t_n)$ and $p(t_{n+1})$ are results of the probability averaging process for successive time slots $t_n$ and $t_{n+1}$. It can be seen that such averaging progressively increases the averaged probability towards 1 while the condition is met, and otherwise progressively decreases the averaged probability towards 0, at a rate which depends upon the integer N.

Thus the averaged probability produced in the step 62 constitutes a C/I reliability criterion, and this is used in the remaining steps of FIG. 3 to determine which of the two possible FCS rates is selected by the mobile terminal.

In the step 63 in FIG. 3, the averaged probability is compared with a threshold value, which can be any desired value selected in the range from 0 to 1. If the averaged probability is greater than the threshold, corresponding to a relatively slow variation of C/I values and hence a relatively reliable prediction of the results of a cell (or sector) switch after the FCS delay, then the step 64 is reached in which the mobile terminal selects the high FCS rate of 100 Hz. If instead the averaged probability is not greater than the threshold, corresponding to a relatively rapid variation of C/I values and hence a relatively unreliable prediction of the results of a cell (or sector) switch, then the step 65 is reached at which the mobile terminal selects the low FCS rate of 10 Hz.

Referring again to FIG. 2, a curve 22 illustrates dependence of throughput gain with speed of a mobile terminal which selects between the two FCS rates of 100 Hz and 10 Hz in the manner described above. As shown by the curve 22, for low mobile terminal speeds below about 5 km/h there is a throughput gain, up to about 30%, similar to that represented by the curve 20, as a result of the high FCS rate of 100 Hz. For high mobile terminal speeds above about 10 km/h there is only a very small throughput loss due to FCS, as a result of the low FCS rate of 10 Hz being selected in this case. For mobile terminal speeds in the range from about 5 km/h to about 10 km/h the throughput gain is positive for the curve 22 (compared with negative for the curve 20). Thus this embodiment of the invention provides advantages in that there is not only a substantial reduction in throughput loss due to FCS for high mobile terminal speeds, but also the transition from throughput gain to throughput loss is shifted to a higher mobile terminal speed (about 10 km/h instead of about 5 km/h); in other words a range of mobile terminal speeds for which the FCS provides a throughput gain is increased from about 5 km/h to about 10 km/h, or approximately doubled.

It can be appreciated that, instead of adaptively selecting the FCS rate in dependence upon the reliability of C/I values as in the embodiment of the invention described above, such selection could be dependent directly on a speed of the mobile terminal, determined by the mobile terminal in any desired manner. The speed of the mobile terminal also constitutes a C/I reliability criterion, in that there is a substantial correlation between the speed of the mobile terminal and the reliability with which the C/I after the FCS delay can be predicted. For example, the high FCS rate of 100 Hz could be selected when it is determined that the mobile terminal speed is less than about 5 km/h, and the low FCS rate of 10 Hz could be selected for higher mobile terminal speeds. While this would still be beneficial, it would not necessarily provide the second advantage mentioned above, of the transition from throughput gain to (small) throughput loss occurring at an increased speed of the mobile terminal.

Similarly, the adaptation or selection of FCS rate in accordance with this invention can be dependent on any other C/I reliability criterion, i.e. on any criterion which has a substantial correlation to the reliability with which C/I is predicted after the FCS delay. For example, a rate of variation of C/I may be used as the C/I reliability criterion, FCS being at a relatively high rate in response to relatively slow variation of C/I and being at a relatively low rate in response to relatively fast variation of C/I.

Thus although a particular embodiment of the invention and variations have been described above in detail, it can be appreciated that these and numerous other modifications, variations, and adaptations may be made without departing from the scope of the invention as defined in the claims.

What is claimed is:

1. In a terminal of a cellular communications system in which fast cell switching (FCS) is provided for selecting forward communications links, for communicating data from respective cells or sectors to the terminal, in response to FCS requests by the terminal on a reverse communications link, a method of determining a rate for FCS requests by the terminal comprising the steps of:
    monitoring C/I (carrier-to-interference ratio) for a plurality of forward communications links to determine preferred forward communications links;
    determining a C/I reliability criterion; and
    making FCS requests each for a preferred forward communications link at a rate dependent on the C/I reliability criterion, said rate being relatively higher for relatively greater C/I reliability.

2. A method as claimed in claim 1 wherein the terminal is a mobile terminal and the C/I reliability criterion comprises a determined speed of the mobile terminal.

3. A method as claimed in claim 1 wherein the C/I reliability criterion comprises a probability that a difference between two C/I values, separated by a predetermined delay, for a forward communications link is less than a predetermined amount.

4. A method as claimed in claim 3 and including a step of averaging said probability over a plurality of time slots of the system.

5. A method as claimed in claim 4 wherein the predetermined delay corresponds to a fast cell switching delay.

6. A method as claimed in claim 4 wherein the FCS requests are made by the terminal at a selected one of two rates, comprising a relatively high rate for relatively greater C/I reliability and a relatively low rate for relatively lesser C/I reliability.

7. A method as claimed in claim 6 wherein the relatively high rate is of the order of about 100 Hz.

8. A method as claimed in claim 6 wherein the relatively low rate is of the order of about 10 Hz.

9. A method as claimed in claim 1 wherein the FCS requests are made by the terminal at a selected one of two rates, comprising a relatively high rate for relatively greater C/I reliability and a relatively low rate for relatively lesser C/I reliability.

10. A method as claimed in claim 9 wherein the relatively high rate is greater than about 20 Hz and the relatively low rate is less than about 20 Hz.

11. A method of communicating requests from a terminal for communication of data to the terminal using preferred communications links associated with respective cells or sectors of a cellular communications system, comprising the steps of, at the terminal:
    monitoring C/I (carrier-to-interference ratio) for a plurality of communications links to determine the preferred communications links; and
    making said requests at a relatively high rate in response to relatively slow variation of C/I and at a relatively low rate in response to relatively fast variation of C/I.

12. A method as claimed in claim 11 and including the step of averaging a C/I prediction error for a delay corresponding to a delay for requesting and making a switch to a preferred communications link, and selecting one of a plurality of rates for making said requests in dependence upon the averaged C/I prediction error.

13. A cellular communications system comprising base stations for communicating signals on forward communications links for respective cells or sectors to mobile terminals and for receiving signals from mobile terminals on reverse communications links, said signals on the reverse communications links including requests from a mobile terminal for switching of communications from a current forward communications link to another forward communications link having a better C/I (carrier-to-interference ratio) as determined by the mobile terminal, the base stations being responsive to such requests for switching said communications, wherein at least one mobile terminal is arranged for changing a rate at which it makes said requests in dependence upon a criterion having a substantial correlation to a reliability with which C/I is determined by the mobile terminal, the mobile terminal changing said rate at least between a relatively high rate for a relatively high reliability and a relatively low rate for a relatively low reliability of the C/I determination.

14. A system as claimed in claim 13 wherein said criterion comprises a speed of the mobile terminal determined by the mobile terminal.

15. A system as claimed in claim 13 wherein said criterion comprises a prediction error of C/I monitored by the mobile terminal.

16. A system as claimed in claim 13 wherein said criterion comprises an averaged probability that a prediction error of C/I monitored by the mobile terminal is less than a predetermined amount.

17. A system as claimed in claim 16 wherein the mobile terminal is arranged to make said requests at a selected one of two rates, comprising a relatively high rate for relatively greater reliability and a relatively low rate for relatively lesser reliability of C/I determination.

18. A system as claimed in claim 17 wherein the relatively high rate is of the order of about 100 Hz.

19. A system as claimed in claim 17 wherein the relatively low rate is of the order of about 10 Hz.

* * * * *